United States Patent [19]

Brigante

[11] 4,288,323
[45] Sep. 8, 1981

[54] FREE FLOW NON-CORROSIVE WATER TREATMENT DEVICE

[76] Inventor: Miguel F. Brigante, 16550 NW. 10th Ave., Miami, Fla. 33169

[21] Appl. No.: 153,219

[22] Filed: May 27, 1980

Related U.S. Application Data

[63] Continuation-in-part of Ser. No. 9,669, Feb. 5, 1979, Pat. No. 4,226,720.

[51] Int. Cl.³ ............................................... C02F 1/48
[52] U.S. Cl. ....................................... 210/222; 210/243
[58] Field of Search ................ 209/164; 210/695, 222, 210/223, 243, 354; 308/37, 135, DIG. 10; 415/71, 72

[56] References Cited

U.S. PATENT DOCUMENTS

| | | | |
|---|---|---|---|
| 1,949,660 | 3/1934 | Roberts | 209/164 |
| 1,988,197 | 1/1935 | Foss | 415/71 X |
| 2,067,108 | 1/1937 | Upton | 415/72 |
| 2,235,052 | 3/1941 | Trier | 415/72 |
| 2,652,925 | 9/1953 | Vermeiren | 210/222 |
| 2,690,842 | 10/1954 | Spluvak | 210/222 X |
| 2,939,830 | 6/1960 | Green et al. | 210/222 X |
| 3,302,934 | 2/1967 | Milligan | 415/72 X |
| 3,463,319 | 8/1969 | Moragne | 210/223 |

*Primary Examiner*—Robert H. Spitzer
*Attorney, Agent, or Firm*—Abraham A. Saffitz

[57] ABSTRACT

A unitary package for water treatment for attachment to a home hot water heater, boiler and the like which is adapted to be easily serviced and installed by the home owner. The water treatment device is constructed to provide free and unobstructed flow of water with no restriction and provides a long-lasting life with very little maintenance. The water treatment device comprises an electromagnetic coil energized by D.C. which completely encircles a control conduit pipe. This pipe is provided at the inlet thereof with a T-shaped fitting having an inlet; the pipe is also provided at the outlet thereof with a similar T-shaped fitting having an outlet. Each of the T-shaped fittings is provided with a male plug at opposing ends for supporting a bearing bushing beyond the inlet and outlet openings of the T-shaped fittings. Each of the bearing bushings supports a solid helical impeller and shaft which rotates only when water flows through the central pipe. The impeller is made of stainless steel (ferromagnetic) and is fitted to a very close tolerance to the wall of the central pipe thereby sweeping in a broom fashion the inner wall free from particles which tend to deposit on the wall when the electromagnetic coil is energized. Since the bearing bushings are outside of the flow line of water, they do not obstruct the free flow of water and are so constructed to provide a long-lasting life.

4 Claims, 4 Drawing Figures

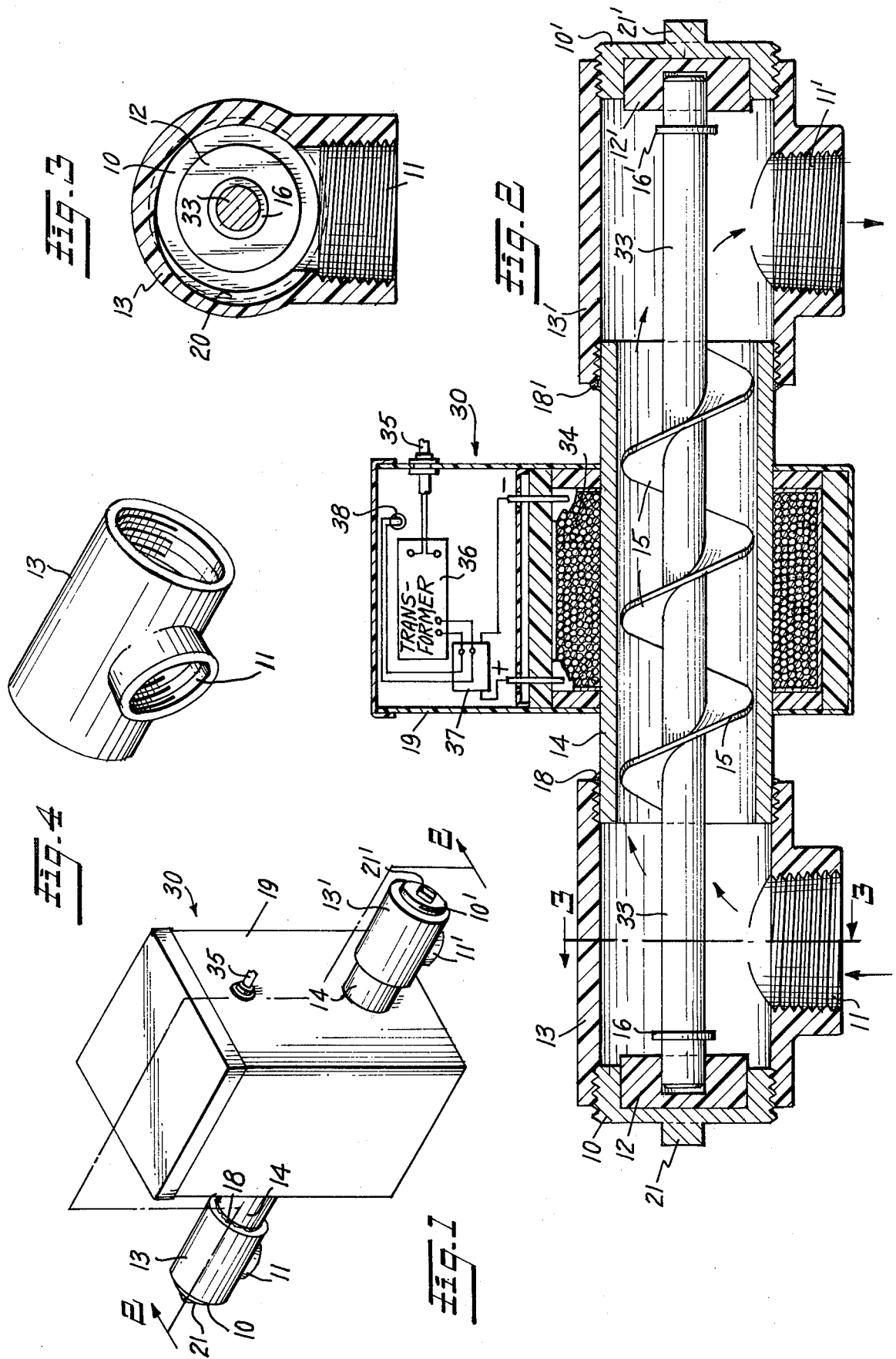

FREE FLOW NON-CORROSIVE WATER TREATMENT DEVICE

RELATIONSHIP TO PRIOR APPLICATIONS

This application is a continuation-in-part of my prior application, Ser. No. 009,669, filed Feb. 5, 1979, entitled "Unitary Package for Water Treatment for Attachment to Home Hot Water Heater", now U.S. Pat. No. 4,226,720.

BACKGROUND OF THE INVENTION

This invention lies in the general field of liquid purification and separation apparatus wherein a magnetic treatment means, e.g., an electromagnetic coil encircling the outside of a conduit pipe containing feed water being treated, is provided for the prevention of deposits by suspended particles of high mineral content, such as iron oxide in the feed water influenced by said magnetic treatment means. This primary magnetic treatment is combined with an additional separating means comprising a ferromagnetic helical impeller responsive to feed water flow fitted within the conduit pipe to sweep away the magnetically attracted particles.

This invention also lies in the field of rotary kinetic fluid motors in combination with a liquid purification and separation apparatus, in this instance, a special engineered and designed helical impeller supported on low friction radial plain bearings. The bearings are specially designed to support the impeller such that they do not interfere with fluid flow by virtue of the T-shaped fittings.

BRIEF DESCRIPTION OF THE PRIOR ART

The basic concept of a separately packaged electromagnetic water treatment device which separates the power source from the electrical conversion machines, e.g., electromagnetic separator used to treat the incoming water is shown in FIG. 4 of the patent to Moragne, U.S. Pat. No. 3,463,319. This patent shows, in FIG. 1, electrical coils 80 secured about a conical separator 10 which functions for the removal of salt or other elements from sea water. In FIG. 4, a battery of such separators, each with its coil, is fed from a salt water source through a pump and the power source for the coils is located at a remote location.

Another teaching of an electrical conversion subassembly used for water treatment separated from an electrical transformer circuit is shown in Roberts, U.S. Pat. No. 1,949,660. In FIG. 1 of this patent, there is shown a high frequency generator and transformer coupled to an electromagnet which together impress magnetic fields on a liquid tubular housing 30 through which an emulsion passes. These combined fields break the emulsion.

In neither Roberts nor Moragne is there a teaching of a unitary special package for the machine adapting the electrical conversion subassembly to be fitted into one compartment of the package and the magnetic assembly and special solid helical impeller supported on special bearings within a conduit for water treatment.

U.S. Pat. No. 2,067,108 to Upton discloses an auger circulating pump, comprising a cylinder 11, an auger 18 within the cylinder supported on bearings 27a and 30, respectively, wherein said auger is driven by a pulley.

U.S. Pat. No. 1,714,268 to Jones discloses a method and structure for assembling a simple shaft 12 on bearing elements 10 and 11 having recessed bearing surfaces A and B.

In neither of the patents to Jones or Upton is there a teaching of a water purification device housing an electromagnetic subassembly coacting with a solid helical impeller supported on special bearings within a conduit for the auxiliary action of sweeping the impeller rotational movement of a close tolerance helical impeller made of ferromagnetic material and supported on specially designed bearings.

OBJECTS OF THE INVENTION

An object of this invention is to provide a unitary special package for water purification by utilizing a magnetic treatment unit comprising a conduit having a large volume of free flowing feed water being treated by an electromagnetic coil encircling the conduit which houses a ferromagnetic impeller.

A further object of the invention is to provide an improved water treatment device wherein the impeller shaft is mounted on specially designed easily replaceable and installed bearings which do not impair fluid flow and provide for optimum precise and secure placement of the impeller within the confines of the electromagnetic unit and the conduit pipe.

A further object of the invention is to provide an improved water treatment device wherein low cost, easily maintained corrosive-free T-shaped fittings are secured to the conduit pipe surrounding the impeller in order to provide free flow of feed water to the impeller without restriction due to bearing placement.

A further object of the invention is to provide an improved water treatment device wherein a greater volume of feed water and unrestricted flow is achieved by specially constructed T-shaped fittings isolating the flow path from the bearings supporting the impeller shaft.

For other and further objects and for a better understanding of the present invention, reference may be had to the following detailed description taken in connection with the accompanying drawing.

SUMMARY OF THE INVENTION

An improved unitary package for water purification and treatment for attachment to a home hot water heater or other appliance which is adapted to be easily maintained, serviced and installed by the home owner. The water treatment device comprises an electromagnetic coil in a housing energized by D.C. which completely encircles a central conduit pipe. This pipe is provided with a T-shaped fitting having a right angle inlet communicating with an inlet of the central conduit pipe, an additional T-shaped fitting having a right angle outlet communicating with an outlet of the central conduit pipe. Each of the T-shaped fittings is provided with bearing bushings at opposed ends for supporting a solid helical impeller and shaft which rotates only when water flows through the central pipe. The helical impeller is fitted to a very close tolerance to the wall of the conduit pipe for sweeping the deposits on the inner wall. The present improvement encompasses the combination of specially designed T-shaped fittings and precise location and structural arrangement of the bearing bushings such that the bearings are outside of the flow line providing free flow of a larger volume of water, with a long-lasting life.

BRIEF DESCRIPTION OF THE DRAWINGS

FIG. 1 shows an elevational view in perspective view of the preferred embodiment of the invention comprising a unitary package of the electrical apparatus water treatment device illustrating the external aspects of the package;

FIG. 2 is a sectional view along line 2—2 of FIG. 1 with certain parts broken away to show details of construction of the components of the special package also showing the details of T-shaped fittings and bearings supporting the impeller shaft;

FIG. 3 is a cross-sectional view taken on line 3—3 through the T-shaped fitting; and FIG. 4 shows an elevational view in perspective view of the T-shaped fitting per se.

DESCRIPTION OF THE PREFERRED EMBODIMENTS

In a preferred embodiment of the invention which is shown in FIGS. 1 and 2, the unitary package 30 is in the form of a rectangular box or housing 19 which encloses a central conduit pipe section 14 in which the rotating impeller means 15 constitutes the secondary magnetic treatment. The primary magnetic treatment means is the D.C. energized coil 34 wound about the entire longitudinal span of conduit pipe 14 between the side walls of the unitary package.

As shown in FIGS. 1 and 2, the unitary package is connected to the usual 110 volt A.C. line 35 (FIG. 2), step down transformer 36, a full wave rectifier 37 and D.C. leads to pilot light 38. The step down transformer 36 reduces the voltage to 24 volts and then to electromagnet coil 34. For optimum results, the solid helical impeller 15 is made integral with the impeller shaft and is designed with six to eight flights of ferromagnetic material extending the full length of the electromagnetic coil 34, so as to produce a high flux density and field intensity surrounding the blades of impeller 15. The impeller shaft 33 is provided adjacent the ends thereof with stainless steel washers 16 and 16' or may be constructed of integral flanges to provide stability and a fly-wheel effect to the rotational aspects of the impeller 15.

The six to eight flights 15 of the helical impeller provide an inner surface which resists flow in the direction of the arrow, e.g., city water. The close spacing and rotation, even at lower water pressure, provide a sweeping action along the entire conduit pipe 14. The induced magnetic field effectively suspends particles which respond to the magnetic fields and to the rotational sweeping action.

The end portions of the impeller shaft 33 are supported by bearing bushings 12 and 12' at each end thereof. These bearing bushings 12 and 12' are constructed of materials to provide long life, friction-free, with infinitesimal whip or whirl. The bearings are also designed to reduce the effects of abrasiveness of contaminants and provide resistance to corrosion. Among these materials having the above stated physical properties, TEFLON and RULON plastics provide optimum results, as well as graphite impregnated stainless steel.

A further feature of this invention is to secure these bearing bushings 12 and 12' to externally threaded male pipe plugs 10 and 10', respectively. This may be accomplished by a press fit, cement or other conventional securing means. Each of the male pipe plugs 10 and 10' are provided with central projections 21 and 21' to facilitate installation or removal from T-shaped fittings 13 and 13', respectively.

Each of the T-shaped fittings 13 and 13', with the bearing assemblies 12 and 12', are axially secured by weldings 18 and 18', or other conventional suitable securing means, on opposite ends of the central conduit pipe 14. The T-shaped fittings 13 and 13', one of which is shown in FIG. 4, may be constructed of black iron pipe, galvanized iron, stainless steel or suitable plastic material, such as PVC, ABS, Delrin, ACETAL, or LEXAN. Each of T-shaped fittings 13 and 13' includes internally threaded port means 11 and 11' to introduce feed water. To this end, T-shaped fitting 13 is formed with an internally threaded inlet 11, and T-shaped fitting 13' is formed with an internally threaded outlet 11'. Each of the T-shaped fittings 13 and 13' is formed with a volute 20 having its largest radius directed substantially radially and at a right angle with respect to port openings 11 and 11', as viewed in FIG. 3. Feed water under pressure tends to fill the entire volume of the T-shaped fittings 13 and 13' and flush out any air or other gases from all dead spaces which might otherwise be by-passed. Direction of feed water flow is indicated by arrows in FIG. 2.

Thus, it is clear that the improved water treatment device provides a greater volume of feed water and unrestricted flow is achieved by the T-shaped fittings 13 and 13' isolating the flow path from the bearings 12 and 12' supporting the impeller shaft 33.

The volume of feed water Q flowing through central conduit 14 having an internal cross-sectional area A with a velocity V may be expressed as:

$$Q = AV.$$

Thus, it is also clear that the bearing assemblies 12 and 12' may be easily replaced and installed, and the T-shaped fittings 13 and 13' may easily be cleaned by removing deposits therein, and since they may be made of plastic material are free of corrosion and deterioration.

The following dimensions are shown for the different size central conduit pipe 14.

TABLE I

| Plastic | A | B | C | D | E |
|---|---|---|---|---|---|
| Pipe | 3/4" | 1" | 1-1/4" | 1-1/2" | 2" |
| O.D. | 1.114 | 1.410 | 1.860 | 2.170 | 2.770 |
| I.D. | 0.824 | 1.050 | 1.380 | 1.610 | 2.067 |
| Black Pipe | | | | | |
| O.D. | 1.20 | 1.320 | 1.655 | 1.900 | 2.375 |
| I.D. | 0.745 | 0.920 | 1.275 | 1.465 | 1.930 |

I claim:

1. In a unitary package water purification and treatment device adapted to be attached to a water appliance comprising:

a 24 volt DC power supply;

an electromagnetic coil within a housing energized by D.C. which completely encircles and extends along substantially the entire length of a centrally supported conduit pipe section;

said electromagnetic coil being fed by 24 volts D.C. to thereby induce a D.C. magnetic field within the interior of said conduit pipe section through which water flows;

an elongated shaft extending through said pipe section and having a solid helical impeller of ferromagnetic material with six to eight flights, longitudinally traversing the entire length of said electromagnetic coil;

end portions of said impeller shaft arranged centrally of said pipe section for central support on bearing bushings at opposing ends of the pipe section;

each of said bearing bushings respectively secured to externally threaded male plugs;

each of said male plugs provided with a means (central projection) for threaded installation and removal of said plugs into opposing ends of internally threaded T-shaped fittings, said T-shaped fitting secured at opposite ends of said central pipe conduit and communicating therewith to define a flow path with the helical impeller;

each of said T-shaped fittings includes internally threaded post means for entrance of feed water and delivery of purified water, such that the flow path is free and unobstructed from the bearings; and each of said T-shaped fittings provided with means for a maximum flow of water through said central pipe section and free of deposits and corrosive effects.

2. A unitary package as claimed in claim 1 wherein said bearings and said T-shaped fittings are constructed of plastic material.

3. A unitary package as claimed in claim 1 wherein said bearings and said T-shaped fittings are constructed of metal.

4. A unitary package as claimed in claim 1 wherein each of said T-shaped fittings is formed with an internal volute having its largest radius directed substantially laterally with respect to the internally threaded port means.

* * * * *